Aug. 16, 1927.
J. A. MacMURCHY
1,639,521
METALLIC PACKING
Filed Jan. 24, 1921
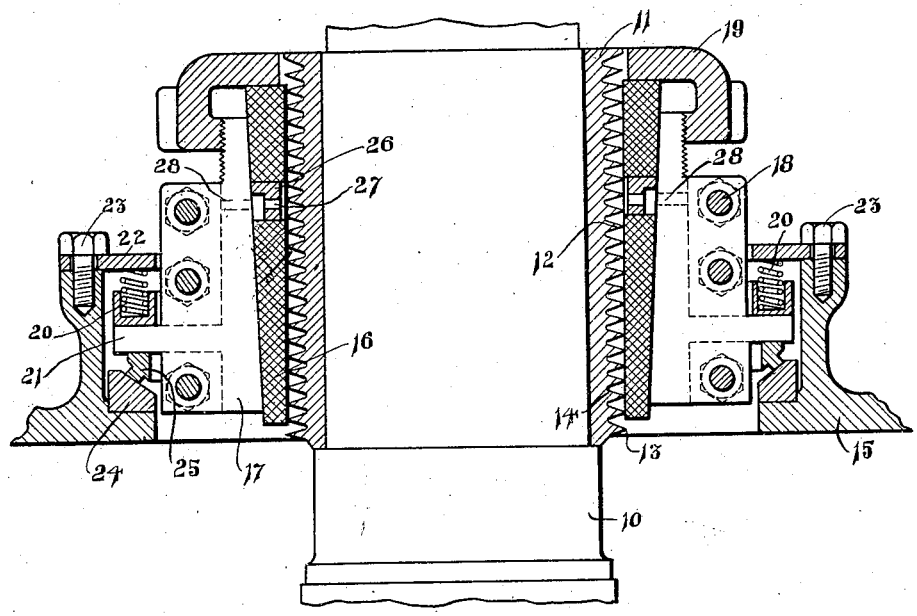
J. A. MacMurchy.
INVENTOR
BY D. C. Davis
ATTORNEY Patented Aug. 16, 1927.

1,639,521

UNITED STATES PATENT OFFICE.

JOHN A. MacMURCHY, OF RIDLEY PARK, PENNSYLVANIA, ASSIGNOR TO WESTINGHOUSE ELECTRIC AND MANUFACTURING COMPANY, A CORPORATION OF PENNSYLVANIA.

METALLIC PACKING.

Application filed January 24, 1921. Serial No. 439,630.

My invention relates to metallic packing and more particularly to labyrinth packing used in packing the rotor shaft of steam turbine and has for an object the employment of a packing of the character designated which shall be simple and durable in construction, capable of ready adjustment or removal, and in which escape of steam shall be largely prevented.

These and other objects will be made more manifest in the following specification and accompanying drawing in which the single figure is a longitudinal sectional view of a packing constructed in accordance with my invention.

Referring to the drawing, I indicate a rotor shaft 10 about which is secured a sleeve 11 having corrugations 12 in the outer periphery thereof, said corrugations having a steep pitch, a sharp outer edge 13 and substantially circular-bottomed troughs 14. I indicate at 15 a portion of the casing of a turbine in which I employ a frusto-conical or wedge-shaped metallic packing 16. A gland 17 is provided, which may be made solid or in section, in which case it is held together by bolts 18. At the upper portion of the gland 17 are threads on which is screwed a gland cap 19 which bears against the wedge-shaped metallic packing 16. The gland 17 may be rigidly fastened to the casing 15 but in my preferred form of construction it is held in place by a series of helical springs 20 arranged around the circumference of the gland 17, these springs abutting against a flange 21 of the gland 17 and a retainer plate 22 which is held in place by tap bolts 23.

Resting in an arcuate shouldered portion of the casing 15 is a special metallic ring 24 upon which rests a corresponding offset ring portion 25 forming a ground joint with the gland 17. The offset portion 25 of the gland 17 and the special metallic ring 24 form a ground joint of the well known ball and socket type which allows motion of the shaft 10 and gland 17 relative to the casing 15.

The packing 16 is divided into two sections by a special metallic ring 26 in which are located outlet ports 27 arranged to communicate with ports 28 in the gland 17. Steam, on reaching the metallic ring 26, which is of slightly larger inside diameter than the metallic sleeve 11, is allowed to escape through the ports 27 and 28. This is a means resorted to in practice to keep the steam from leaking past the gland to the bearing which is usually located adjacent to the packing gland in small turbine construction.

Having thus described the arrangement of an apparatus constructed in accordance with my invention, the operation is as follows: Assuming the packing is to withstand a relatively high steam pressure, some of the steam will leak between the sharp edges 13 of the shaft sleeve 11 and the shaft packing 16 into the spaces between the concentric corrugations and in successive steps will be greatly reduced in pressure upon reaching the outlet ports 27 provided in the special metallic ring 26. In case of excessive wear, the gland cap 19 may be screwed down slightly, thereby decreasing the diameter of the packing 16 and producing a closer clearance between the corrugations of the sleeve 11 and the metallic packing 16 to maintain the sealing capacity of the gland.

I have further provided for lateral or angular movement of the gland and casing by means of the special construction of the ground joint formed by the offset portion 25 of member 17 and the ring 24. In normal operation, the springs 20 which abut the retainer plate 22 and flange 21 hold the offset portion 25 against its seat 24 with such force as to prevent any leakage of steam past this point, this construction being in the form of a ball and socket joint. Therefore, it will readily be seen that any motion of the shaft will be readily compensated for in this joint without any undue strain on the packing or the gland.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In combination with a rotor shaft, a corrugated sleeve on the shaft, a wedge shaped metallic packing having an inner cylindrical surface in line contact with the apices of the corrugations, and a follower to increase the contact between the corrugations and the inner cylindrical surface of the sleeve packing.

2. In combination with a rotor shaft, a corrugated sleeve for the shaft, a wedge-shaped metallic sleeve packing in contact with the corrugations, a follower to increase the contact between said corrugations and gland packing, and means associated with the gland to compensate for lateral movement of the shaft.

3. In combination with a rotor shaft, a corrugated sleeve element surrounding the shaft, a supporting member for the shaft, a sectional gland within the supporting member and surrounding the shaft, a wedge-shaped metallic packing between the gland and the corrugated sleeve, a screw cap follower attached to the gland and adapted to increase the contact of the packing with the corrugated portions of the shaft, and a ground joint means to compensate for lateral movement of the shaft within its support.

4. A labyrinth packing for a turbine shaft, comprising a gland retainer for the packing, said packing comprising a corrugated sleeve surrounding the shaft, the outer portions of the corrugations being relatively sharp and of uniform diameter, a wedge-shaped metallic packing divided into two parts, a metallic ring interposed between the two parts, and outlet ports located in said ring.

5. In combination with a shaft, a support for the shaft, a gland carried by the shaft, a labyrinth packing for the gland, said packing comprising a wedge-shaped member of soft metal divided into two parts, a metallic ring located between said parts and having outlet ports located therein, and a means including a ground-joint connection to compensate for lateral movements of said shaft.

6. In combination with a rotor shaft, a corrugated sleeve on the shaft, a metallic packing of annular conformation having an inner cylindrical surface and an outer conoidal surface, a retainer for the metallic packing, and means associated with the retainer for adjusting the contact between the peripheral edges of the corrugations and the inner cylindrical surface of the metallic packing.

7. In combination with a rotor shaft, a corrugated sleeve on the shaft, the outer portions of the corrugations being relatively sharp and of uniform diameter, a metallic packing of annular conformation having an inner cylindrical surface and an outer conoidal surface, a retainer for the metallic packing, and means associated with the retainer for adjusting the contact between the relatively sharp outer edges of the corrugations and the inner cylindrical surface of the metallic packing.

In testimony whereof, I have hereunto subscribed my name this 20th day of January, 1921.

J. A. MacMURCHY.